United States Patent
Kal et al.

(10) Patent No.: US 11,182,647 B2
(45) Date of Patent: Nov. 23, 2021

(54) DISTRIBUTED SENSOR MODULE FOR TRACKING

(71) Applicant: Facebook Technologies, LLC, Menlo Park, CA (US)

(72) Inventors: Muzaffer Kal, Redmond, WA (US); Armin Alaghi, Kirkland, WA (US); Vincent Lee, Seattle, WA (US); Richard Andrew Newcombe, Seattle, WA (US); Amr Suleiman, Redmond, WA (US); Muhammad Huzaifa, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 174 days.

(21) Appl. No.: 16/654,798

(22) Filed: Oct. 16, 2019

(65) Prior Publication Data
US 2021/0117722 A1   Apr. 22, 2021

(51) Int. Cl.
*G06K 9/00* (2006.01)
*G06K 9/62* (2006.01)
(Continued)

(52) U.S. Cl.
CPC .............. *G06K 9/6256* (2013.01); *G06T 7/97* (2017.01); *H04N 5/247* (2013.01)

(58) Field of Classification Search
CPC . G06T 2207/10016; G06T 2207/30252; G06T 7/292; G06T 2207/30232; G06T 7/80; G06T 2207/30244; G06T 7/251; G06T 7/579; G06T 7/246; G06T 2207/10028; G06T 7/70; G06T 7/74; G06T 11/00; G06T 2207/10024; G06T 7/73; G06T 2207/10012; G06T 2207/30241; G06T 7/248; G06T 7/33; G06T 7/55; G06T 17/05; G06T 2207/10021; G06T 2207/20104; H04N 5/247; H04N 7/181; H04N 17/002; H04N 5/23238; H04N 5/232939; H04N 5/265; H04N 5/44504; H04N 13/239; H04N 13/246; A61B 2034/2048; A61B 1/00006;
(Continued)

(56) References Cited

U.S. PATENT DOCUMENTS

2015/0213617 A1* 7/2015 Kim ................... G06K 9/00798
                                                              382/103
2018/0315211 A1* 11/2018 Chen ...................... G01C 21/20

* cited by examiner

*Primary Examiner* — Alex Kok S Liew
(74) *Attorney, Agent, or Firm* — Baker Botts L.L.P.

(57) ABSTRACT

In one embodiment, a method for tracking includes capturing a first frame of the environment using a first camera, identifying, in the first frame, a first patch that corresponds to the first feature, accessing a first local memory of the first camera that stores reference patches identified in one or more previous frames captured by the first camera, and determining that none of the reference patches stored in the first local memory corresponds to the first feature. The method further includes receiving, from a second camera through a data link connecting the second camera with the first camera, a reference patch corresponding to the first feature. The reference patch is identified in a previous frame captured by the second camera and of the second camera. The method may then determine correspondence data between the first patch and the reference patch, and tracks the first feature in the environment based on the determined correspondence data.

20 Claims, 12 Drawing Sheets

(51) Int. Cl.
*H04N 5/247* (2006.01)
*G06T 7/00* (2017.01)

(58) Field of Classification Search
CPC ............ A61B 1/00057; A61B 1/00149; A61B 1/0016; A61B 1/0051; A61B 1/0052; A61B 1/0057; A61B 1/01; A61B 1/018; A61B 2017/00477; A61B 2034/2061; A61B 2034/301; A61B 34/30
See application file for complete search history.

701

DISTRIBUTED SENSOR MODULE FOR TRACKING

TECHNICAL FIELD

This disclosure generally relates to visual inertial odometry (VIO) tracking, and more specifically methods, apparatus, and system for VIO tracking coordinating multiple sensor modules.

BACKGROUND

Mobile devices like AR/VR headsets face several practical design constraints, such as the need to minimize power consumption and security concerns. A critical challenge for AR/VR devices to achieve these needs is to be able to reduce communications between sensors, e.g., cameras, and a central unit, e.g., an off-device stage providing extensive services. For example, when a camera captures a series of frames, these frames would be further sent to the central unit for localization, mapping, and pose estimation, etc. However, the AR/VR devices may not secure data and privacy when sending images from the cameras to the stage, and furthermore, may not reduce power due to frequent data communication. It is desirable for the AR/VR devices to be able to have an improved sensor module with an optimized power performance and secured data transmission.

SUMMARY OF PARTICULAR EMBODIMENTS

To address the foregoing problems, disclosed are methods, apparatuses, and a system, to perform feature tracking at a sensor module utilizing visual inertial odometry (VIO) and data streaming. The present disclosure provides a self-sufficient sensor module in a VIO-based SLAM tracking system. The sensor module comprises a camera, an identifying unit, a tracking unit, and a memory to track a specific feature without excessive data transmission with a central module, so that said VIO-based SLAM tracking system may secure data and privacy by reducing the amount of data transmission, and furthermore, save power during operation. The camera is configured to capture one or more frames of the environment, and the identifying unit is configured to identify patches from these frames. The identifying unit may determine a specific feature that has been requested to track from these patches and also store these patches in the memory for future reference, such as reference patches for tracking. Furthermore, the tracking unit is configured to determine correspondence data between the patch which corresponds the specific feature and a reference patch stored in the memory, and to track the specific feature based on the correspondence data between the two patches without a further inquiry of feature information with the central module.

The embodiments disclosed herein are only examples, and the scope of this disclosure is not limited to them. Particular embodiments may include all, some, or none of the components, elements, features, functions, operations, or steps of the embodiments disclosed herein. According to one embodiment of a method, the method comprises, by a computing system of a first camera, receiving a request to track a first feature in an environment. The method further comprises capturing a first frame of the environment using the first camera. The method yet further comprises identifying, in the first frame, a first patch that corresponds to the first feature. The method additionally comprises accessing a first local memory of the first camera that stores reference patches identified in one or more previous frames captured by the first camera. The method additionally comprises determining that none of the reference patches stored in the first local memory corresponds to the first feature. The method further comprises receiving, from a second camera through a data link connecting the second camera with the first camera, a reference patch corresponding to the first feature. The reference patch is identified in a previous frame captured by the second camera and of the second camera. Furthermore, the method comprises determining correspondence data between the first patch and the reference patch. The method additionally comprises tracking the first feature in the environment based on the determined correspondence data.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Certain aspects of the present disclosure and their embodiments may provide solutions to these or other challenges. There are, proposed herein, various embodiments which address one or more of the issues disclosed herein. The methods disclosed in the present disclosure may provide a self-efficient, VIO-based sensor module to track a feature requested by the central module based on reference patches stored at its own memory or shared by other sensor modules, in order to limit unnecessary transmission outside of the sensor modules. Furthermore, the central module disclosed in the present disclosure may identify which sensor module might be able to track the feature based on state information identified in a previous frame and inertial measurement unit (IMU) information provided by IMU(s), and then instruct said sensor module to track the feature or to share the reference patch with another sensor module which is currently tracking the feature. Therefore, the VIO-based tracking system disclosed in the present disclosure may perform the tracking task efficiently and secure data and privacy.

Particular embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains drawings executed in color. Copies of this patent or patent application publication with color drawing(s) will be provided by the Office upon request and payment of the necessary fee.

The accompanying drawing figures incorporated in and forming a part of this specification illustrate several aspects of the disclosure, and together with the description serve to explain the principles of the disclosure.

FIG. 6 illustrates an embodiment of feature tracking process at the tracking unit.

DESCRIPTION OF EXAMPLE EMBODIMENTS

Currently, AR/VR devices face multiple challenges, such as a light-weighted head-mounted device, power consumption, and cyber security. Sending data, such as images and correspondence data of the user, beyond a sensor module might be running into a risk of data breach. Furthermore, a frequent data transmission consumes more power and impact the battery performance. Particular embodiments disclosed in the present disclosure provide multiple self-efficient, distributed sensor modules in a visual inertial odometry (VIO)-based simultaneous localization and mapping (SLAM) tracking system, the VIO-based SLAM system enables the sensor modules to share reference patches via a data link internally, so that the sensor module may perform a feature-tracking without communicating with the central module excessively. In addition, the distributed sensor modules communicate with the central module via a command link which is independent from the data link between the distributed sensor modules. Therefore, the distributed module only communicates with the central module for specific services, for example, feature metadata retrieval, global localization, and the like, to improve security and battery performance.

Particular embodiments disclosed in the present disclosure provide a sensor module in the VIO-based SLAM tracking system comprising a camera, a tracking unit, an identifying unit, and a memory to perform a feature-tracking based on reference patches stored in the memory. The identifying unit may identify that a patch identified from a frame captured by the camera corresponds to the feature requested by the central module, and further retrieve a reference patch which corresponds to the feature from the memory. In addition, the identifying unit can also retrieve the reference patch corresponding to the feature from another sensor module. Each distributed sensor module computes and stores patch individually to prevent a system failure, even if a part of the system is not functioning. Therefore, the VIO-based SLAM tracking system disclosed in the present disclosure is able to perform a power-saving, self-efficient and secure tracking for the user.

Particular embodiments disclosed in the present disclosure further provide a central module in the VIO-based SLAM tracking system comprising an inertial measurement unit (IMU) integration unit, a filter unit, projection unit, and a mapping unit. The central module may send a request to a sensor module to track a feature. The request sent from the central unit may comprise identifier and metadata of the feature. The central module may also identify which sensor module might be able to track the feature based on pose information of the user identified by IMU data and location information of the sensor module. Therefore, said VIO-based SLAM tracking system may perform tracking effectively and reduce data transmission.

Figure 1:
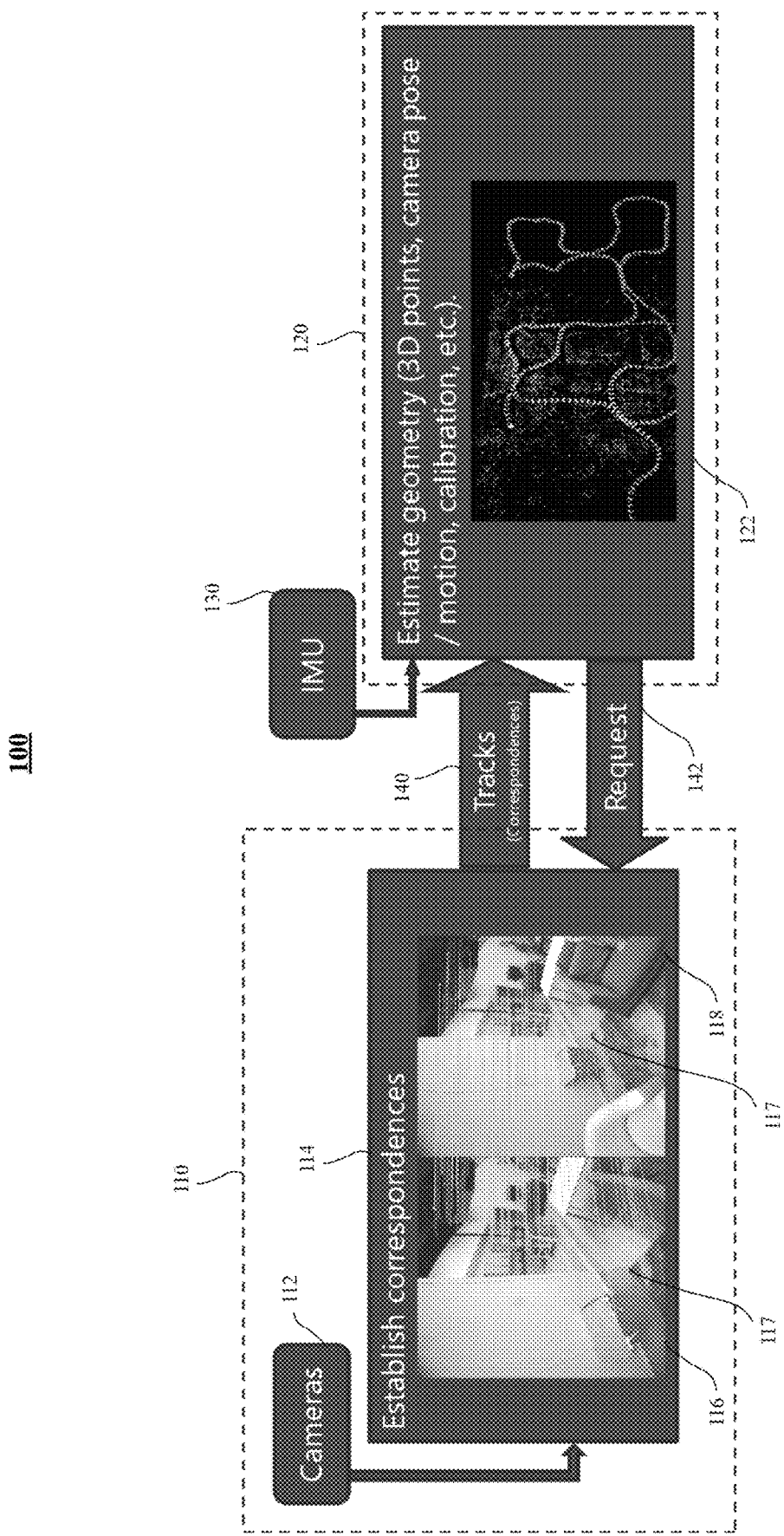
FIG. 1 illustrates an example diagram of a tracking system architecture.

FIG. 1 illustrates an example VIO-based SLAM tracking system architecture, in accordance with certain embodiments. The tracking system 100 comprises at least one sensor module 110 and a central module 120. The sensor module 110 comprises at least one camera 112 which captures a frame of an environment, at least one processor 114 which identifies patches from the frame captured by the camera 112 and tracks a feature in the identified patches, and a memory (not shown) which stores reference patches identified by the processor from the previous frames. The processor 114 of the tracking system 100 determines correspondence data of a feature between patches corresponding to each other identified in different frames. For example, the sensor module 110 identifies that a first patch 116 identified in a first frame corresponds to a first feature 117, such as a corner of a carpet on the floor or a cushion on a sofa. The sensor module 110 may then retrieve a reference patch 118 from its memory corresponding to the first feature 117, so that the sensor module 110 may establish correspondence data 140 between the first patch 116 and the reference patch 118, and send the correspondence data 140 to the central module 120. The central module 120 comprises at least one processor 122 which generates state information based on the correspondence data 140 from the sensor module 110 and raw IMU data from IMU 130. For example, the central module 120 estimates a state of a user based on feature points identified in the frames provided in the correspondences data 140, and camera poses, velocity, acceleration and motion provided in the raw IMU data sent from IMU(s) 130. In particular embodiments, the state information may comprise a pose, and potentially a previous route, of the user relative to an environment built by the series of frames captured by the cameras 112 of the sensor module 110.

Figure 2:
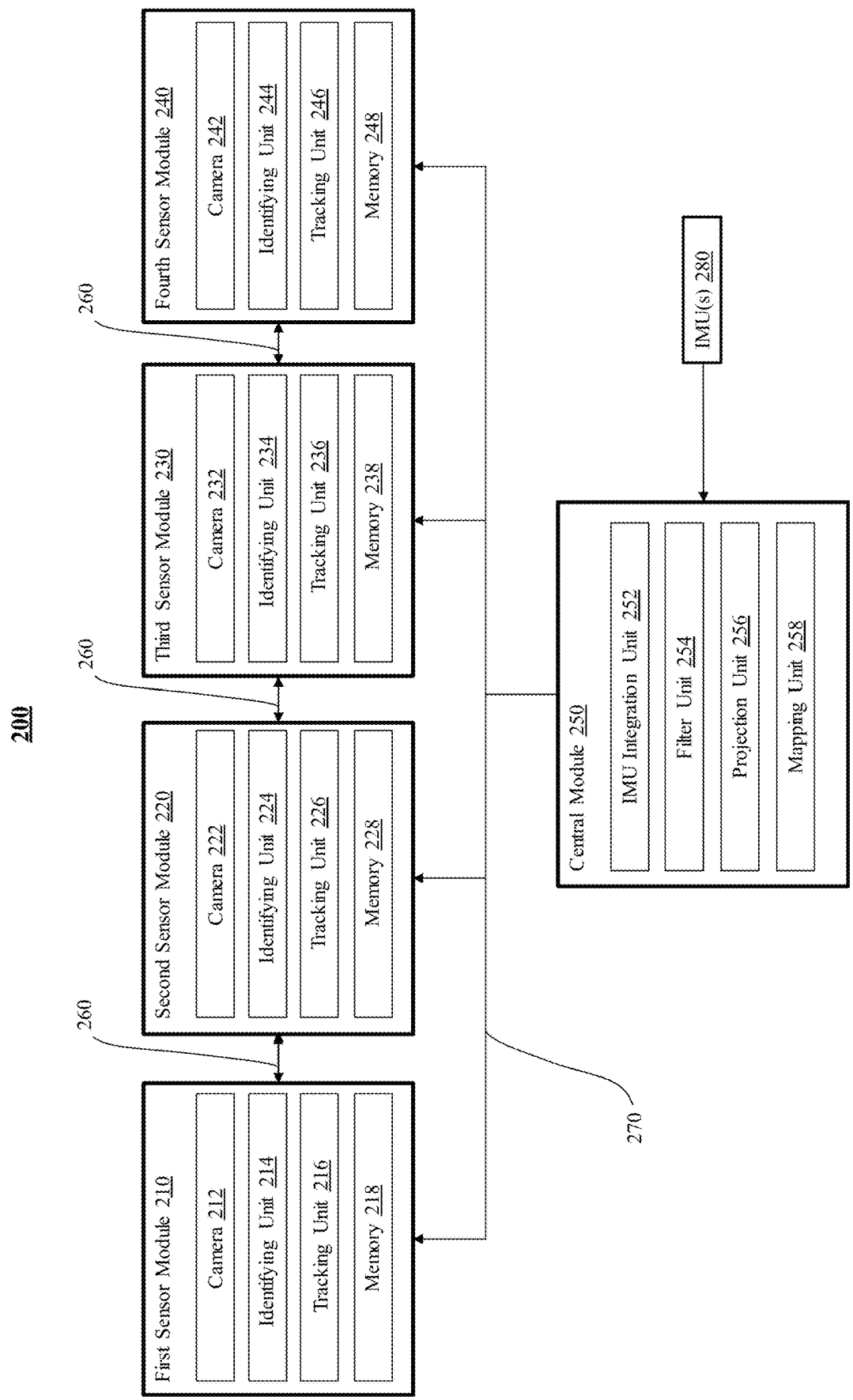
FIG. 2 illustrates an embodiment of a tracking system with distributed sensor modules.

FIG. 2 illustrates an example tracking system architecture comprising multiple distributed sensor modules, in accordance with certain embodiments. The tracking system 200 comprises four sensor modules 210, 220, 230, 240 and a central module 250. Each sensor module comprises a camera, an identifying unit, a tracking unit, and a memory to perform a self-sufficient tracking for a specific feature in an environment. For example, a first sensor module 210 comprises a camera 212, an identifying unit 214, a tracking unit 216, and a memory 218. The sensor modules 210, 220, 230, 240 communicate with each other via a data link 260. In particular embodiments, the data link 260 provides a data streaming for the sensor modules 210, 220, 230, 240 internally, so that the sensor modules 210, 220, 230, 240 may share information stored in its owe memory with another sensor module.

The central module 250 comprises an IMU integration unit 252, a filter unit 254, a projection unit 256, and a mapping unit 258 to perform extensive services based on tracking information received from the sensor modules 210, 220, 230, 240, such as generating a state of a user/device, locating the user/device locally or globally, and/or rendering a virtual tag/object in the environment. In particular embodiments, the central module 250 communicates with the sensor modules 210, 220, 230, 240 via a command link 270. The command link 270 is separated from the data link 260 which improves security for the distributed sensor modules 210, 220, 230, 240 in the tracking system 200. In particular embodiments, the central module 250 receives raw IMU data from IMU(s) 280 and process the raw IMU data at the IMU integration unit 252 to provide a predicted pose of the user in assistance of generating the state of a user. In particular embodiments, the filter unit 254 may provide the state information of the user to the projection unit 256 to project a virtual object in the environment or a virtual tag in a map. The mapping unit 258 of the central module 250 may locate the sensor modules 210, 220, 230, 240 by retrieving a live map corresponding to the correspondence data sent from the sensor modules 210, 220, 230, 240 if needed. Detailed operations and actions performed at the central module 250 may be further described in FIG. 3.

In FIG. 2, the camera 212 of the first sensor module 210 captures a first frame of an environment upon receiving a request from the central module 250 to track a first feature in the environment. In particular embodiments, the central module 250 may identify which sensor module might have a better position to track the first feature based on the state of the user identified in a previous frame, a predicted pose of the user, and/or a location of the user, and then send the request to the identified sensor module via the command link. For example, the central module 250 may identify that the first sensor module 210 has a better position, such as a location of the user in the environment in the previous frame and/or a predicted pose, e.g., a viewing angle, of the user/device identified by the integrated IMU data, to track the first feature. The central module 250 may then send the request of tracking the first feature to the first sensor module 210. In particular embodiments, the request may comprise an identifier of the first feature, metadata of the first feature, and/or a pose of the user/device in the previous frame.

In FIG. 1, the identifying unit 214 receives the first frame of the environment captured by the camera 212, and identifies one or more patches from the first frame. Among these patches, the identifying unit 214 may identify that a first patch corresponds to the first feature. In particular embodiments, the identifying unit 212 may request the camera 212 to capture another frame of the environment when none of the patched identified from the first frame corresponds to the first feature. In particular embodiments, the identifying unit 214 may inform the central unit 250 that the first sensor module 210 may not be able to track the first feature when none of the patched identified from the first frame corresponds to the first feature. When the first feature is identified in the first frame, the identifying unit 214 may then access the memory 218 to search a reference patch which corresponds to the first feature. The memory 218 stores reference patches identified in the previous frames which are captured by the camera 212. The identifying unit 214 may further send the first patch and the reference patch which correspond to the first feature to the tracking unit 216.

In particular embodiments, when the identifying unit 214 fails to find a reference patch which corresponds to the first feature in the memory 218, the identifying unit 214 may inform the central unit 250 that the first sensor module 210 may not be able to track the first feature. In another embodiment, when the identifying unit 214 fails to find a reference patch which corresponds to the first feature in the memory 218, the identifying unit 214 may try to retrieve a reference patch which corresponds to the first feature from another sensor module, such as the second sensor module 220, the third sensor module 230, and/or the fourth sensor module 240, via a data link. In particular embodiments, the identifying unit 216 may further send the first frame and the reference patch retrieved from another sensor module to the memory 218 to be stored for future reference.

In FIG. 2, the tracking unit 216 receives the first patch and the reference patch corresponding to the first feature. The tracking unit 216 then determine correspondence data between the first patch and the reference patch. In particular embodiments, the tracking unit 216 may also utilize the pose of the user/device received from the central unit 250 to assist with the determination of the correspondence data between the first patch and the reference patch. The tracking unit 216 tracks the first feature in the environment based on the correspondence data. In particular embodiments, the tracking unit 216 may further send observations and measurements of the first feature back to the central module 250, such as the correspondence data, an identifier of the first feature and/or the first sensor module 210, location of the first feature, and identified points in the captured frames, for various functions.

In particular embodiments, the filter unit 254 of the central module 250 may further determine a state of the user/device based on the correspondence data and the observations and measurements of the first feature received from the first sensor module 210 and the integrated IMU data determined by the IMU integration unit 252. Furthermore, the central module 250 may also provide the state information of the user/device determined by the filter unit 254 in the request for the sensor module to track the first feature. Detailed operations and actions for estimating the state of the user/device performed at the filter unit 254 may be further described in FIG. 3.

In particular embodiments, the tracking system 200 may be implemented in any suitable computing device, such as, for example, a personal computer, a laptop computer, a cellular telephone, a smartphone, a tablet computer, an augmented/virtual reality device, a head-mounted device, a portable smart device, a wearable smart device, or any suitable device which is compatible with the tracking system 200. In the present disclosure, a user which is being tracked and localized by the tracking device may be referred to a device mounted on a movable object, such as a vehicle, or a device attached to a person. In the present disclosure, a user may be an individual (human user), an entity (e.g., an enterprise, business, or third-party application), or a group (e.g., of individuals or entities) that interacts or communicates with the tracking system 200. In particular embodiments, the sensor module may be implemented in a head-mounted device, and the central module 250 may be implemented in a local computing device separated from the head-mounted device. The head-mounted device comprises one or more processors configured to implement the camera, the identifying unit, the tracking unit, and the memory of the sensor module. In one embodiment, each of the processors is configured to implement the camera, the identifying unit, the tracking unit, and the memory separately. The local computing device comprises one or more processors configured to implement the IMU integration unit 252, the filter unit 254, the projection unit 256, and the mapping unit 258 of the central module 250. In one embodiment, each of the processors is configured to implement the IMU integration unit 252, the filter unit 254, the projection unit 256, and the mapping unit 258 separately.

This disclosure contemplates any suitable network to connect each element in the tracking system 100 or to connect the tracking system 100 with other systems. As an example and not by way of limitation, one or more portions of network may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network may include one or more networks.

Figure 3:
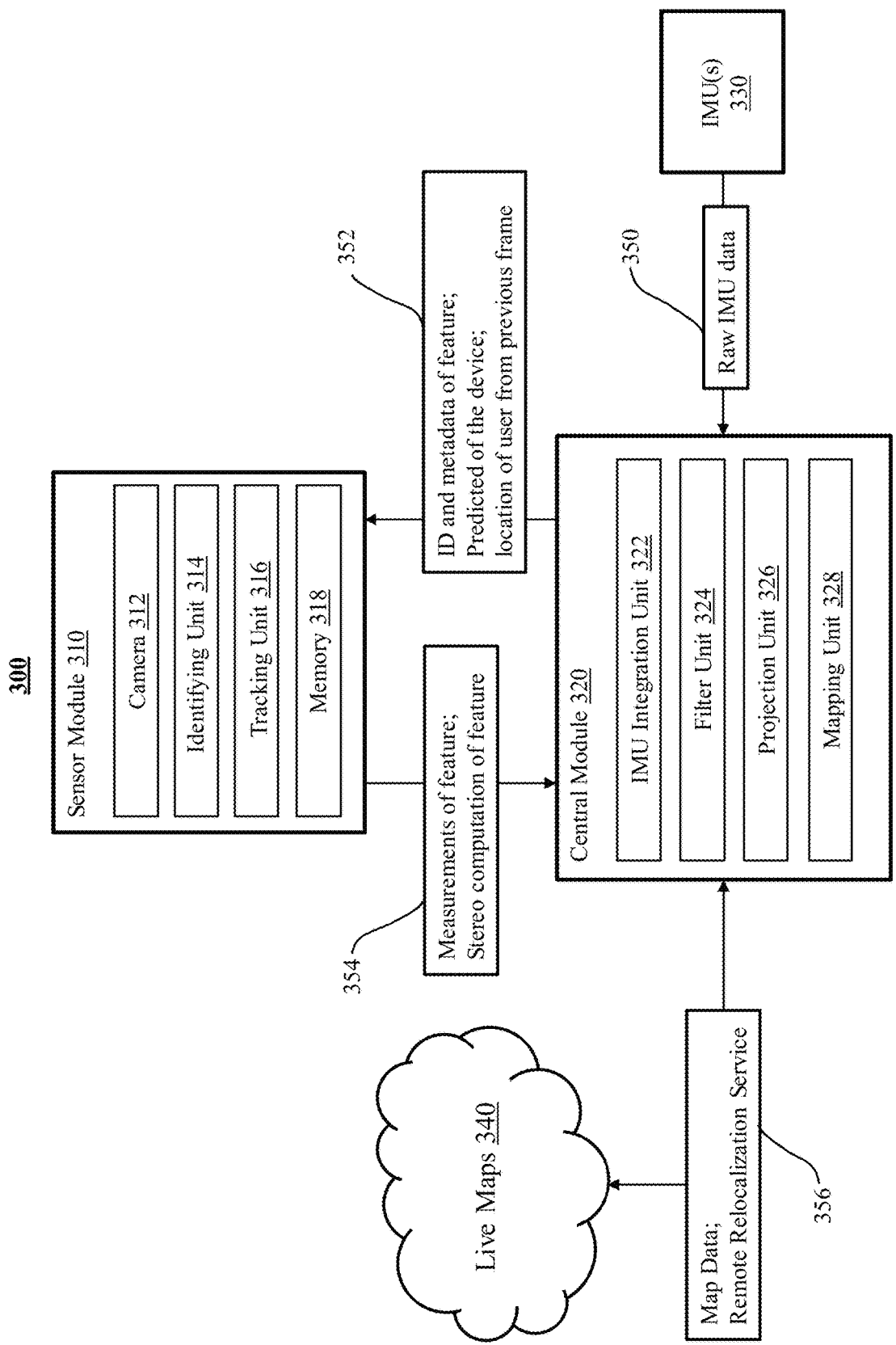
FIG. 3 illustrates an example diagram of feature tracking by the tracking system with a distributed sensor module.

FIG. 3 illustrates an example diagram of a tracking method 300 performed between a sensor module 310 and a central module 320, in accordance with certain embodiments. The sensor module 310 comprises a camera 312, an identifying unit 314, a tracking unit 316, and a memory 318. The sensor module 310 receives a request 352 of tracking a feature from the central module 320. The request 352 comprises an identifier and metadata of the feature, a state of the sensor module 310 which is identified in a previous frame captured by the camera 312 and is stored in the central module 320. The camera 312 of the sensor module 310 captures a first frame of the environment upon receiving the request 352 and sends the first frame to the identifying unit 314. The identifying unit 314 may then identify one or more patches in the first frame.

In particular embodiments, at least one patch among the one or more patches corresponds to the feature requested by the central module 320. For example, at least one patch identified in the first frame comprises the feature that the central module 320 requests to track, or at least part of feature which suffices requirements for the sensor module 310 to track. The identifying unit 314 may access the memory 318 to search a reference patch corresponding to the feature. The memory 318 stores reference patches identified in previous frames captured by the camera 312. The identifying unit 314 may send the identified patch and the reference patch which comprise/correspond to the feature to the tracking unit 316. In particular embodiments, the identifying unit 314 may send the identified patch to the memory 318 to be stored. In particular embodiments, the identifying unit 314 may send the identified patch to the central module 320 to be stored.

The tracking unit 318 determines correspondence data between the identified patch and the reference patch. The correspondence data may comprise observations and measurements of the feature, such as a location of the feature in the environment. Furthermore, the tracking unit 316 may also perform a stereo computation of the feature to provide additional information for the central module 320. The tracking unit 316 then sends tracking information 354 to the central module 320 to further determinations and services. In particular embodiments, the tracking information 354 may comprise an identifier of the feature, the observations and measurements of the feature, the correspondence data, and/or the stereo computation of the feature. Furthermore, the sensor module 310 sends frames with identified features to the central module 320 to be stored if needed.

In FIG. 3, the central module 320 comprises an IMU integration unit 322, a filter unit 324, a projection unit 326, and a mapping unit 328. The IMU integration unit 322 receives raw IMU data 350 from one or more IMUs 330 and processes the raw IMU data 350 to provide predicted poses of the user to the filter unit 324 for estimating a state of the user. The IMU integration unit 322 integrates rotational velocity measurements to track an orientation of the user, integrates acceleration measurements to track velocity of the user, and furthermore, double-integrates rotational velocity and acceleration to track a position of the user. In particular embodiments, the IMU integration unit 322 determines the predicted poses of the user based on rotational velocity and specific forces detected from the user, e.g. body acceleration plus gravity in body frame, included in the raw IMU data 350. In particular embodiments, the IMU integration unit 322 may send the predicted poses to the sensor module 310 for assisting with feature search. The IMU integration unit 322 further aggregates one or more IMU measurements to provide pre-integration data to the filter unit 324 for estimating the state of the user. In particular embodiments, the IMU integration unit 322 may also receive the state of the user from the filter unit 324 to calibrate its IMU measurements. Furthermore, the IMU integration unit 322 may send low-latency poses to one or more warp engines for late-stage warp. In particular embodiments, the low-latency pose may be specific to a pose in a relatively short time period, for example, less than 0.5 second. Furthermore, the IMU integration unit 322 may send the processed IMU data to one or more warp engines for late-stage warp, low-latency pose rendering, and image tracking aid.

The filter unit 324 receives the tracking information 354 from the tracking unit 316 of the sensor module 310 and receives the aggregated IMU measurements from the IMU integration unit 322. The filter unit 324 may estimate a state of the user based on the tracking information 354 and the aggregated IMU measurements. In particular embodiments, the state of the user may comprise a pose of the user relative to an environment which is built based on the frames captured by one or more sensor module. Furthermore, the filter unit 324 may send state information of the user to the IMU integration unit 322 to refine or calibrate IMU measurements. In addition, the filter unit 324 may also send the state information of the user and the tracking information 354 to the mapping unit 328 for a global or local localization.

The projection unit 326 may project the tracked feature in a frame based on the state information of the user and the tracking information 354. For example, the projection unit 326 may project the identified points/tracked features as a virtual object, which can be viewed in a range of field of view (FOV) of the user's head-mounted device, in the environment. Furthermore, the projection unit 326 may project the identified points in the frame based on the correspondence data.

The mapping unit 328 may communicate with the filter unit 324 and a cloud 340 to trigger certain actions if needed, for example, retrieving map information 356 from the cloud 340 and requesting a remote localization service. In particular embodiments, the mapping unit 328 may comprise an on-device storage which stores one or more small, offline maps. In particular embodiments, the mapping unit 328 may read or retrieve live maps stored in the cloud 340 on demand or periodically. In particular embodiments, the mapping unit 328 may operate with an anchor interface to send data over to one or more users, client system, networking system, third-party system, or any suitable system and network, in order to share and persist common data identified in the tracking system 300 to be utilized via an application. In particular embodiments, the mapping unit 328 may build or update a corresponding global map stored in the cloud 340 based on the state information and tracked features in the tracking information 354 provided by the filter unit 324.

In particular embodiments, the sensor module 310 may be implemented in a mobile device, which is separated from the central module 320 of the tracking system 300 implemented in a local device, as in a two-part system.

Figure 4:
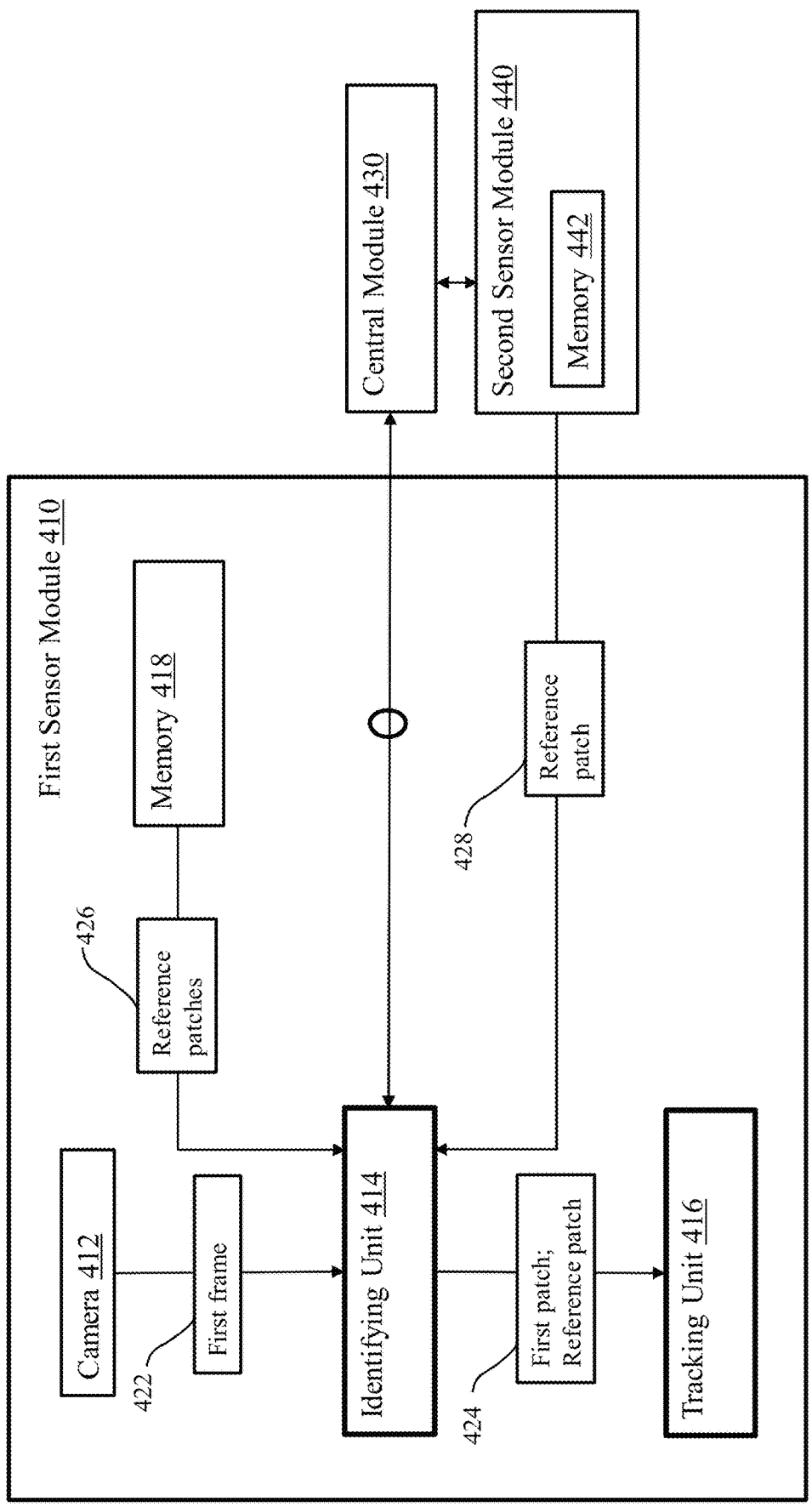
FIG. 4 illustrates an example diagram of feature tracking with reference patch shared by a second sensor module via data streaming.

FIG. 4 illustrates an example diagram of a tracking method 400 utilizing data streaming between a first sensor module 410 and a second sensor module 420, in accordance with certain embodiments. When the central module 430 sends a request, which comprises an identifier and meta data of a first feature for tracking and a pose of the user, to a first sensor module 410, the first sensor module 410 starts to track the first feature upon the receipt of the request. A camera 412 of the first sensor module is configured to capture a first frame 422 of the environment based on the request and provide the first frame 422 to an identifying unit 414 for a further identification. The identifying unit 414 is configured to identify, in the first frame, a first patch that corresponds to the first feature and access a memory 418 of the first sensor module 410, which stores reference patches 426 identified in one or more previous frames captured by the camera 412, to retrieve a reference patch corresponding to the first feature. When the identifying unit 414 determines that none of the reference patches 426 stored in the memory 418 corresponds to the first feature, the identifying unit 414 may send a message to inform the central module 430 that none of the reference patch 426 in the memory 418 corresponds to the first feature. The central module 430 may determine that a second sensor module 440 may have a reference patch 428 corresponding to the first feature in response to receiving the message from the first sensor module 410. The central module 430 may then inform the first sensor module 410 to retrieve the reference 428 from the second sensor module 440. In particular embodiments, the central module 430 may request the second sensor module 440 to take over the request of tracking the first feature from the first sensor module 410.

The first sensor module 430 receives, from the second sensor module 440, the reference patch 428 corresponding to the first feature. In particular embodiments, the reference patch is identified in a previous frame captured by the second sensor module 440. In particular embodiments, the reference patch 428 may be received by the identifying unit 414 to be determined that the reference patch 428 corresponds to the first feature. In particular embodiments, the reference patch 428 may be sent to the tracking unit 416 directly to track the first feature. The tracking unit 416 determines correspondence data between the first patch and the reference patch and tracks the first feature in the environment based on the determined correspondence data.

Figure 5:
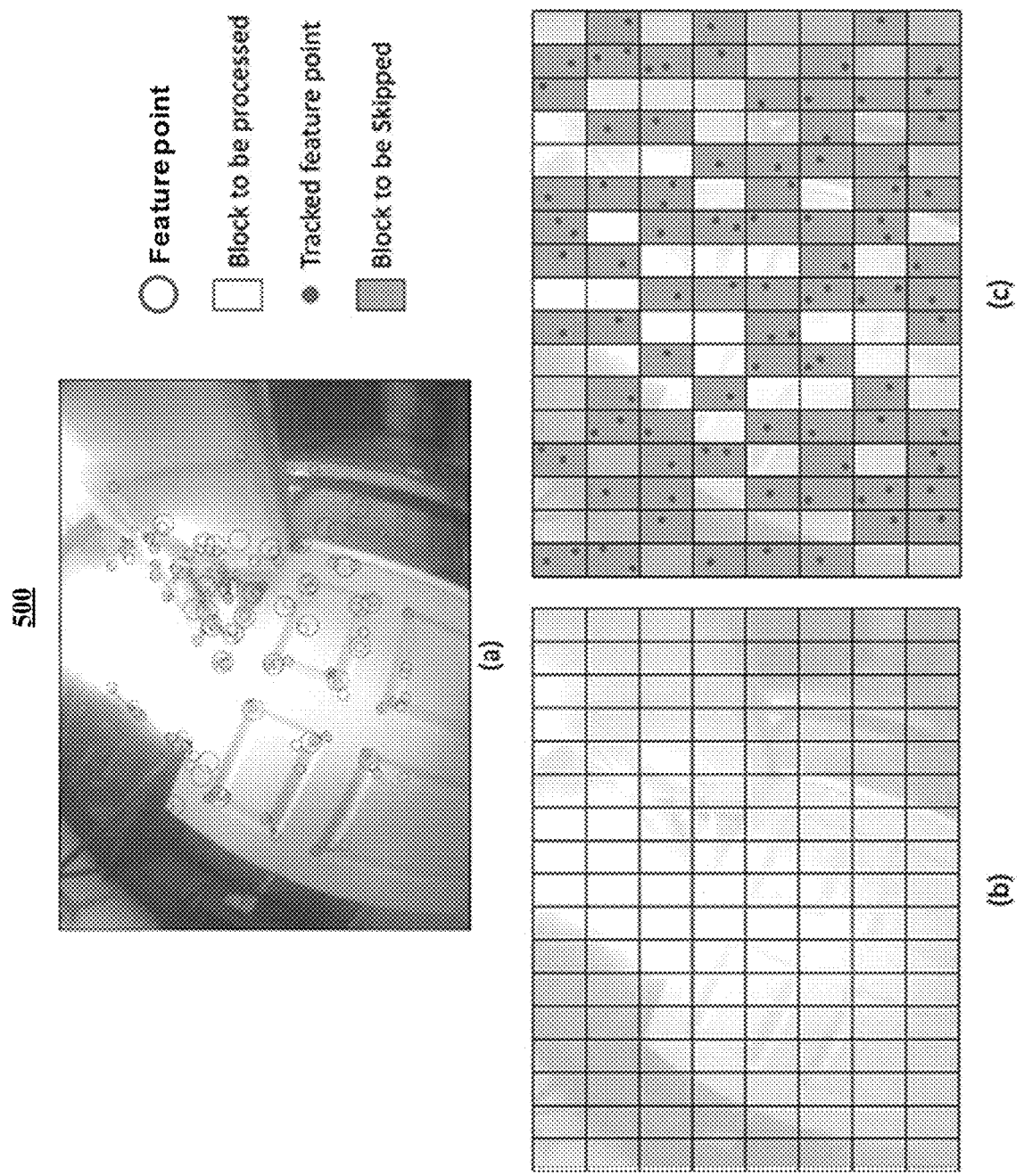
FIG. 5 illustrates an example diagram of an identifying unit identifying features in patches identified in a frame.

FIG. 5 illustrates an example diagram of an identifying unit 500 identifying a first patch in a first frame, in accordance with certain embodiments. The identifying unit 500 identifies multiple patches from a first frame captured by a camera implemented in the same sensor module. In particular embodiments, the identifying unit 500 may also identify the patches from the frame with an assistance of a predicted pose and a state of the user provided by the central module. In FIG. 5*a*, the identifying unit 500 identifies one or more feature points in the first frame. For example, a corner of the door frame and a rim of the door panel. In FIG. 5*b*, the identifying unit 500 processes the first frame one block by one block, e.g., a block-based processing. In particular embodiments, a size of the block may be static. In particular embodiments, the size of the block may be dynamic based on a requirement of processing time of the tracking system. In FIG. 5*c*, the identifying unit 500 processes the blocks and the feature points to identify which blocks comprises tracked feature points, and identifies patches in the first frame. In particular embodiments, the identifying unit 500 identifies which patch corresponds to a feature requested to track.

In particular embodiments, the identifying unit 500 identifies one or more features in images from frame to frame. In particular embodiments, the feature may be a descriptor, a key point, a 3D point, or a map point. The identifying unit 500 extracts features in an environment on multiple levels. For example, the identifying unit 500 may extract features while implementing streaming and supporting multiple regions of interest (ROIs) per image or per the series of images. Furthermore, the identifying unit 500 may utilize non-maximal suppression, local ranking, and image-noise-based adaptive thresholding in feature extraction. Optionally, descriptors may be extracted to be used for map matching, map building, and relocation of the user, and as patches for a subsequent search at the identifying unit 500. In particular embodiments, the descriptor may be Oriented FAST and Rotated BRIEF (ORB) and Fast Retina Keypoint (FREAK) adapted for lens distortion.

FIG. 6 illustrates an embodiment of feature tracking process 600 at the tracking unit, in accordance with certain embodiments. The tracking unit of the sensor module may track features identified in different patches. In particular embodiments, the tracking unit of the sensor module may track a first feature 602 from a first patch identified in a first frame to a reference patch identified in a previous frame. The reference patch corresponds to the first feature 602. In particular embodiments, the reference patch may be stored in a memory of the sensor module. In particular embodiments, the reference patch may be provided by another sensor module via a data link. The tracking unit may search area based on correspondence data determined by the first patch and the reference patch to define a search region 604. In particular embodiments, the search region 604 may be an epipolar line segment.

Figure 7A:
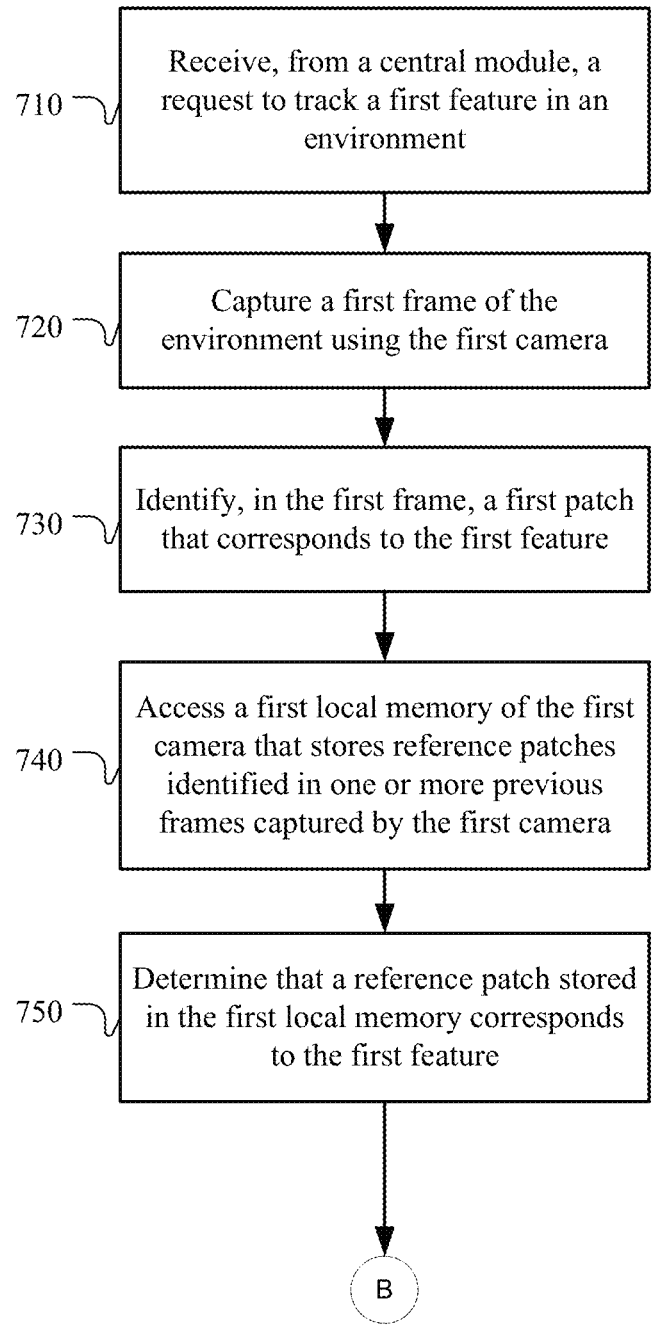
FIG. 7A illustrates an embodiment of a method for identifying a feature in an environment at a single sensor module.

FIG. 7A illustrates an example method 700 for identifying a feature in an environment by a single sensor module of the tracking system, in accordance with certain embodiments. The sensor module of the tracking system may be provided to or displayed on any computing system (e.g., an end user's device, such as a smartphone, virtual reality system, gaming system, etc.). The method 700 may begin at step 710 receiving, from a central module at a first sensor module, a request to track a first feature in an environment. In particular embodiments, the request may comprise an identifier and metadata of the first feature and a pose of the first sensor module (e.g. a first camera of the first sensor module) which is identified in a previous frame captured by the first camera and is stored in the central module.

At step 720, the method 700 may capture a first frame of the environment using the first camera.

At step 730, the method 700 may identify, in the first frame, a first patch that corresponds to the first feature.

At step 740, the method 700 may access a first local memory of the first camera that stores reference patches identified in one or more previous frames captured by the first camera.

At step 750, the method 700 may determine that a reference patch stored in the first local memory corresponds to the first feature.

Figure 7B:
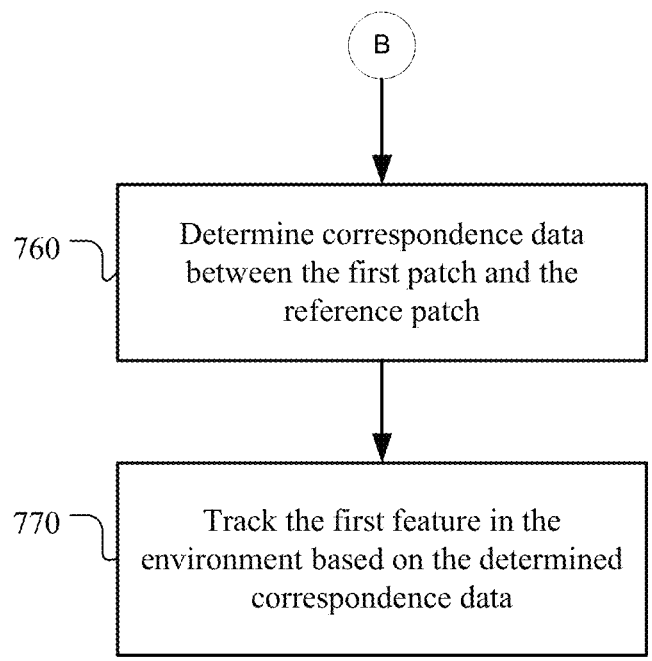
FIG. 7B illustrates an embodiment of a method for tracking the feature using the reference patch stored in the sensor module.

FIG. 7B illustrates an example method 701 for tracking the feature in the environment by a sensor module of the tracking system, in accordance with certain embodiments. The method 701 may begin, at step 760 follows the step 750 in the method 701, determining correspondence data between the first patch and the reference patch. In particular embodiments, the determining of the correspondence data comprises identifying the first feature in the first patch, and searching, in the reference patch, for a second feature that corresponds to the first feature in the first patch. The searching is performed along an epipolar line segment determined using the received pose. In particular embodiments, the first sensor module comprises the first camera configured to capture the first frame of the environment, the first local memory configured to store the reference patches, an identifying unit configured to identify the first patch in the first frame that corresponds to the first feature and to determine that at least one of the reference patches stored in the first local memory corresponds to the first feature, and a tracking unit configured to determine the correspondence data between the first patch and the reference patch and to track the first feature in the environment based on the determined correspondence data.

At step 770, the method 701 may track the first feature in the environment based on the determined correspondence data. In particular embodiments, the first camera may be located within a head-mounted device, and the central module may be implemented in a local computing device separated from the head-mounted device. In particular embodiments, the head-mounted device may comprise one or more processors, and the one or more processors are configured to implement the sensor, the identifying unit, and the tracking unit.

Particular embodiments may repeat one or more steps of the method of FIGS. 7A-7B, where appropriate. Although this disclosure describes and illustrates particular steps of the method of FIGS. 7A-7B as occurring in a particular order, this disclosure contemplates any suitable steps of the method of FIGS. 7A-7B occurring in any suitable order. Moreover, although this disclosure describes and illustrates an example method for local localization including the particular steps of the method of FIGS. 7A-7B, this disclosure contemplates any suitable method for local localization including any suitable steps, which may include all, some, or none of the steps of the method of FIGS. 7A-7B, where appropriate. Furthermore, although this disclosure describes and illustrates particular components, devices, or systems carrying out particular steps of the method of FIGS. 7A-7B, this disclosure contemplates any suitable combination of any suitable components, devices, or systems carrying out any suitable steps of the method of FIGS. 7A-7B.

Figure 8A:
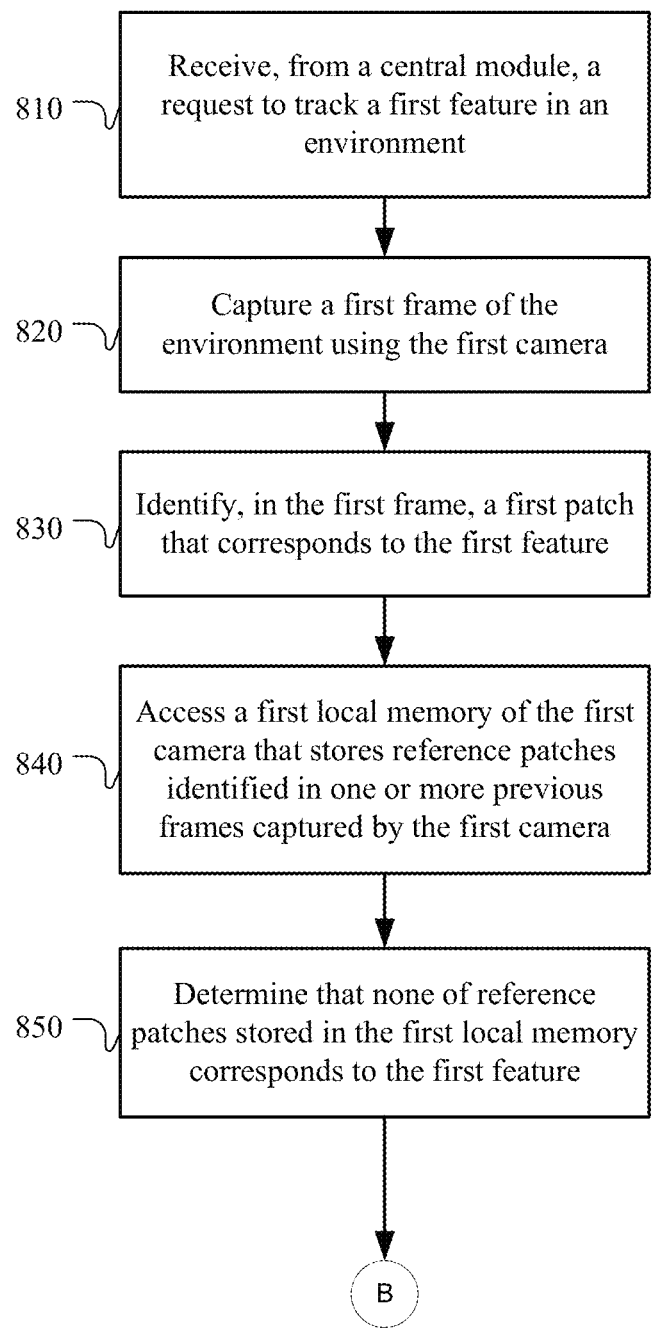
FIG. 8A illustrates an embodiment of a method for identifying a feature in an environment at a first sensor module.

FIG. 8A illustrates an example method 800 for identifying a feature in an environment by multiple sensor modules of the tracking system, in accordance with certain embodiments. The sensor module of the tracking system may be provided to or displayed on any computing system (e.g., an end user's device, such as a smartphone, virtual reality system, gaming system, etc.). The method 800 may begin at step 810 receiving, from a central module at a first sensor module, a request to track a first feature in an environment. In particular embodiments, the request may comprise an identifier and metadata of the first feature and a pose of the first sensor module (e.g. a first camera of the first sensor module) which is identified in a previous frame captured by the first camera and is stored in the central module.

At step 820, the method 800 may capture a first frame of the environment using the first camera.

At step 830, the method 800 may identify, in the first frame, a first patch that corresponds to the first feature.

At step 840, the method 800 may access a first local memory of the first camera that stores reference patches identified in one or more previous frames captured by the first camera.

At step 850, the method 800 may determine that none of the reference patches stored in the first local memory corresponds to the first feature.

Figure 8B:
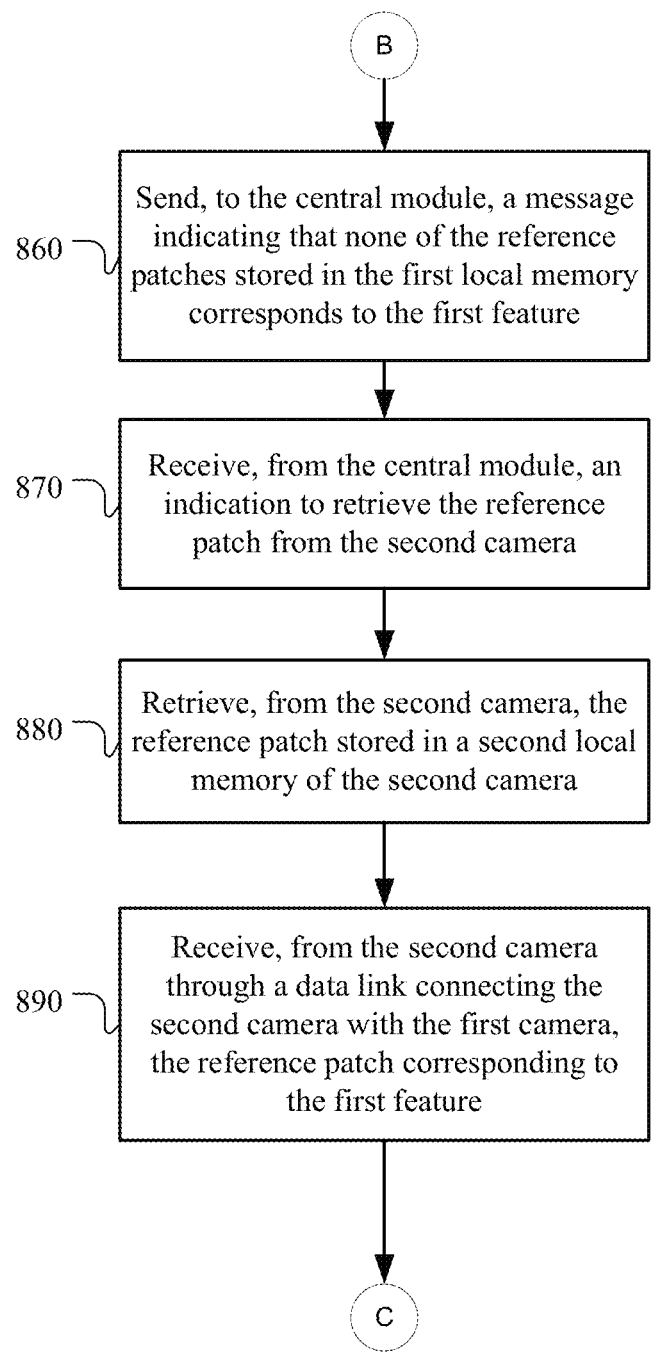
FIG. 8B illustrates an embodiment of a method for retrieving a reference patch from a second sensor module.

FIG. 8B illustrates an example method 801 for sending a message to the central module indicating that none of the reference patches stored in the first local memory corresponds to the first feature, in accordance with certain embodiments. The method 801 may begin, at step 860 follows the step 850 in the method 800, sending, to the central module from the first sensor module, a message indicating that none of the reference patches stored in the first local memory corresponds to the first feature. In particular embodiments, the first sensor module sends the indication to the central module via a command link which is separated from a data link between the sensor modules.

At step 870, the method 801 may receive, from the central module, an indication to retrieve the reference patch from a second sensor module (e.g., a second camera). In particular embodiments, the first sensor module receives the indication from the central module via a command link which is separated from the data link between the sensor modules.

At step 880, the method 801 may retrieve, from the second sensor module, the reference patch stored in a second local memory of the second sensor module. In particular embodiments, the first sensor module may retrieve the reference patch stored in the second local memory of the second sensor module via a data link which is separated from the command link communicating with the central module.

At step 890, the method 801 may receive, from the second sensor module through the data link with the first sensor module, the reference patch corresponding to the first feature.

In particular embodiments, the method 801 may also determine, at an identifying unit of the first sensor module, that the reference patch corresponding to the first feature stores in a second local memory of the second camera, and retrieve, from the second camera, the reference patch stored in the second local memory of the second camera. In this particular embodiment, the method 801 may determine which sensor module stores the reference patch by its own identifying unit without requesting an instruction from the central module.

Figure 8C:
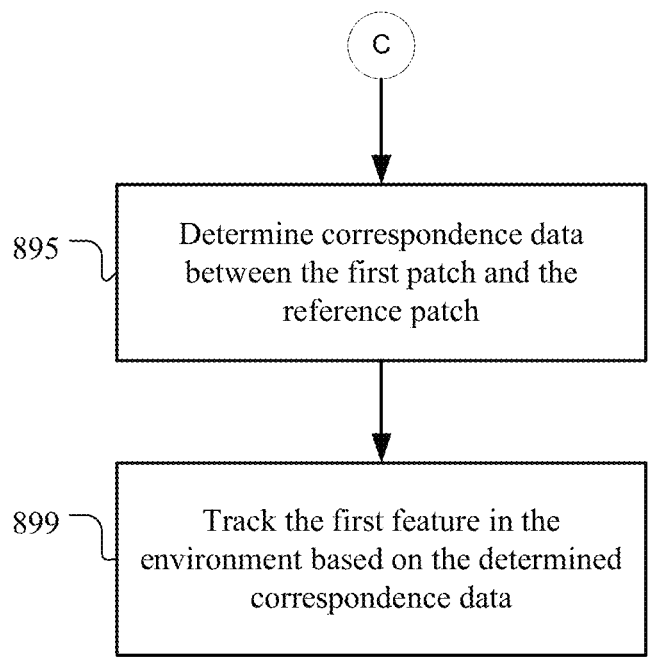
FIG. 8C illustrates an embodiment of a method for tracking the feature based on the reference patch from the second sensor module at the first sensor module of the tracking system.

FIG. 8C illustrates an example method 802 for tracking the feature in the environment by the first sensor module of the tracking system, in accordance with certain embodiments. The method 802 may begin, at step 895 follows the step 890 in the method 801, determining correspondence data between the first patch and the reference patch. In particular embodiments, the determining of the correspondence data comprises identifying the first feature in the first patch, and searching, in the reference patch, for a second feature that corresponds to the first feature in the first patch. The searching is performed along an epipolar line segment determined using the received pose. In particular embodiments, each sensor module comprises a camera configured to capture a first frame of the environment, a local memory configured to store the reference patches, an identifying unit configured to identify a first patch in the first frame that corresponds to the first feature and to determine that at least one of the reference patches stored in the local memory corresponds to the first feature, and a tracking unit configured to determine the correspondence data between the first patch and the reference patch and to track the first feature in the environment based on the determined correspondence data.

At step 899, the method 802 may track the first feature in the environment based on the determined correspondence data. In particular embodiments, the first sensor module (e.g. the first camera) may be located within a head-mounted device, and the central module may be implemented in a local computing device separated from the head-mounted device. In particular embodiments, the head-mounted device may comprise one or more processors, and the one or more processors are configured to implement the sensor, the identifying unit, and the tracking unit.

Particular embodiments may repeat one or more steps of the method of FIGS. 8A-8C, where appropriate. Although this disclosure describes and illustrates particular steps of the method of FIGS. 8A-8C as occurring in a particular order, this disclosure contemplates any suitable steps of the method of FIGS. 8A-8C occurring in any suitable order. Moreover, although this disclosure describes and illustrates an example method for local localization including the particular steps of the method of FIGS. 8A-8C, this disclosure contemplates any suitable method for local localization including any suitable steps, which may include all, some, or none of the steps of the method of FIGS. 8A-8C, where appropriate. Furthermore, although this disclosure describes and illustrates particular components, devices, or systems carrying out particular steps of the method of FIGS. 8A-8C, this disclosure contemplates any suitable combination of any suitable components, devices, or systems carrying out any suitable steps of the method of FIGS. 8A-8C.

Figure 9:
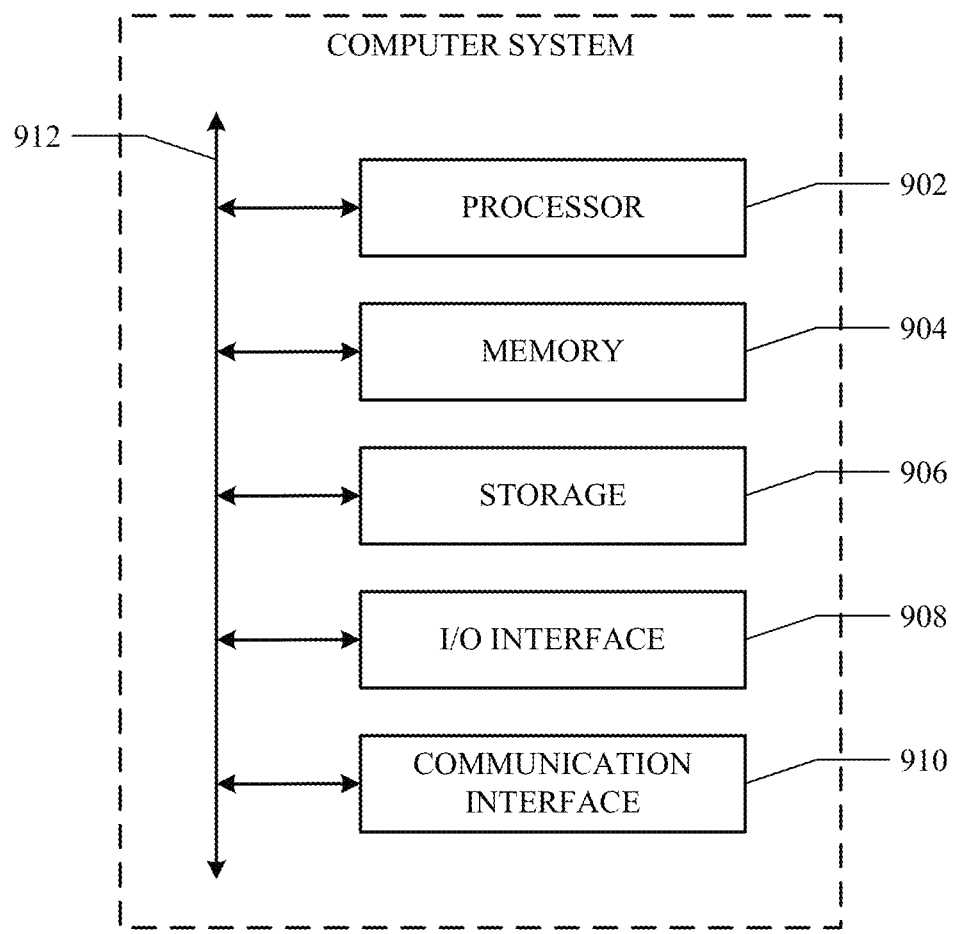
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

According to various embodiments, an advantage of features herein is that each sensor module of the VIO-based tracking system may perform a self-sufficient tracking based on the reference patch stored its memory or shared by other sensor module via a data link, so that said VIO-based tracking system may limit data transmission to a central module but still provide an efficient and secure tracking in the environment, and furthermore, prevent data loss when one of the distributed sensor modules crashes. Particular embodiments of the present disclosure also enable a sensor module of the tracking system to track a specific feature in the environment based on the identifier or metadata of the specific feature provided by the central module. Furthermore, when the specific feature cannot be tracked from the sensor module which received the request from the central module, the central module may further identify another sensor module which is likely able to track the specific feature based on a previous pose of each sensor module stored at the central module. Therefore, particular embodiments disclosed in the present disclosure may provide a light weight, power-efficient, data-secured wearable tracking device.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising, by a computing system of a first camera:
receiving a request to track a first feature in an environment;
capturing a first frame of the environment using the first camera;
identifying, in the first frame, a first patch that corresponds to the first feature;
accessing a first local memory of the first camera that stores reference patches identified in one or more previous frames captured by the first camera;
determining that none of the reference patches stored in the first local memory corresponds to the first feature;
receiving, from a second camera through a data link connecting the second camera with the first camera, a reference patch corresponding to the first feature, wherein the reference patch is identified in a previous frame captured by the second camera and of the second camera;

determining correspondence data between the first patch and the reference patch; and tracking the first feature in the environment based on the determined correspondence data.

2. The method of claim 1, wherein the receiving the reference patch corresponding to the first feature comprises:

sending, to a central module, a message indicating that none of the reference patches stored in the first local memory corresponds to the first feature;

receiving, from the central module, an indication to retrieve the reference patch from the second camera; and retrieving, from the second camera, the reference patch stored in a second local memory of the second camera.

3. The method of claim 1, wherein the receiving the reference patch corresponding to the first feature comprises:

determining that the reference patch corresponding to the first feature stores in a second local memory of the second camera; and retrieving, from the second camera, the reference patch stored in the second local memory of the second camera.

4. The method of claim 2, wherein the message is sent to the central module via a command link, wherein the command link is separated from the data link.

5. The method of claim 1, wherein the first camera comprises:

a sensor configured to capture the first frame of the environment;

the first local memory configured to store the reference patches;

an identifying unit configured to identify the first patch in the first frame that corresponds to the first feature and to determine that none of the reference patches stored in the first local memory corresponds to the first feature; and a tracking unit configured to determine the correspondence data between the first patch and the reference patch and to track the first feature in the environment based on the determined correspondence data.

6. The method of claim 5, wherein the second camera is in data communication and data stream with the first camera via the data link.

7. The method of claim 5, wherein the request comprises an identifier and metadata of the first feature and a pose of the first camera which is identified in a previous frame captured by the first camera and is stored in the central module.

8. The method of claim 7, wherein the determining of the correspondence data comprises:

identifying the first feature in the first patch; and searching, in the reference patch, for a second feature that corresponds to the first feature in the first patch;

wherein the searching is performed along an epipolar line segment determined using the received pose.

9. The method of claim 5, wherein the first camera is located within a head-mounted device; and wherein the central module is implemented in a local computing device separated from the head-mounted device.

10. The method of claim 9, wherein the head-mounted device comprises one or more processors, wherein the one or more processors are configured to implement the sensor, the identifying unit, and the tracking unit.

11. One or more computer-readable non-transitory storage media embodying software that is operable when executed to:

receive a request to track a first feature in an environment;

capture a first frame of the environment using a first camera;

identify, in the first frame, a first patch that corresponds to the first feature;

access a first local memory of the first camera that stores reference patches identified in one or more previous frames captured by the first camera;

determine that none of the reference patches stored in the first local memory corresponds to the first feature;

receive, from a second camera through a data link connecting the second camera with the first camera, a reference patch corresponding to the first feature, wherein the reference patch is identified in a previous frame captured by the second camera and of the second camera;

determine correspondence data between the first patch and the reference patch; and track the first feature in the environment based on the determined correspondence data.

12. The media of claim 11, wherein the receiving the reference patch corresponding to the first feature comprises:

sending, to a central module, a message indicating that none of the reference patches stored in the first local memory corresponds to the first feature;

receiving, from the central module, an indication to retrieve the reference patch from the second camera; and retrieving, from the second camera, the reference patch stored in a second local memory of the second camera.

13. The media of claim 11, wherein the receiving the reference patch corresponding to the first feature comprises:

determining that the reference patch corresponding to the first feature stores in a second local memory of the second camera; and retrieving, from the second camera, the reference patch stored in the second local memory of the second camera.

14. The media of claim 12, wherein the message is sent to the central module via a command link, wherein the command link is separated from the data link.

15. The media of claim 11, wherein the first camera comprises:

a sensor configured to capture the first frame of the environment;

the first local memory configured to store the reference patches;

an identifying unit configured to identify the first patch in the first frame that corresponds to the first feature and to determine that none of the reference patches stored in the first local memory corresponds to the first feature; and a tracking unit configured to determine the correspondence data between the first patch and the reference patch and to track the first feature in the environment based on the determined correspondence data.

16. The media of claim 15, wherein the second camera is in data communication and data stream with the first camera via the data link.

17. The media of claim 15, wherein the request comprises an identifier and metadata of the first feature and a pose of the first camera which is identified in a previous frame captured by the first camera and is stored in the central module.

18. The media of claim 17, wherein the determining of the correspondence data comprises:
   identifying the first feature in the first patch; and
   searching, in the reference patch, for a second feature that corresponds to the first feature in the first patch;
   wherein the searching is performed along an epipolar line segment determined using the received pose.

19. The media of claim 15,
   wherein the first camera is located within a head-mounted device; and
   wherein the central module is implemented in a local computing device separated from the head-mounted device.

20. A system comprising: one or more processors; and one or more computer-readable non-transitory storage media coupled to one or more of the processors and comprising instructions operable when executed by the one or more of the processors to cause the system to:
   receive, from a central module, a request to track a first feature in an environment;
   capture, by a sensor of a first camera, a first frame of the environment;
   identify, at an identifying unit of the first camera, a first patch that corresponds to the first feature in the first frame;
   access, to a first local memory of the first camera, reference patches identified in one or more previous frames captured by the first camera;
   determine, at the identifying unit of the first camera, that none of the reference patches stored in the first local memory corresponds to the first feature;
   receive, from a second camera through a data link connecting the second camera with the first camera, a reference patch corresponding to the first feature, wherein the reference patch is identified in a previous frame captured by the second camera and of the second camera;
   determine, at a tracking unit of the first camera, correspondence data between the first patch and the reference patch; and
   track, at the tracking unit of the first camera, the first feature in the environment based on the determined correspondence data.

* * * * *